United States Patent Office 3,584,123
Patented June 8, 1971

3,584,123
METHOD OF TREATMENT OF SKIN DISEASES AND THERAPEUTIC PRODUCTS FROM THE ROOTS OF SECURIDACA LONGIPEDONCULATA
Pierre Tubery, Mercenac, Ariege, France
No Drawing. Continuation-in-part of application Ser. No. 742,199, July 3, 1968. This application Dec. 4, 1969, Ser. No. 882,279
Int. Cl. A61v *27/00*
U.S. Cl. 424—195   5 Claims

ABSTRACT OF THE DISCLOSURE

Skin diseases, particularly eczema and psoriasis, are treated by administration per os of an alcoholic extraction product of the root of the shrubby species known as *Securidaca longipedonculata*.

---

This application is a continuation in part of Ser. No. 742,199, now abandoned.

The present invention relates to a process for the treatment of skin diseases, more particularly for the treatment of eczema and psoriasis, with the aid of active constituents obtained by extraction from *Securidaca longipedonculata*.

The active constituent employed according to the invention is prepared by using as the starting product a shrubby species of the polygalaceae family, called *Securidaca longipedonculata*. The roots of this plant are harested during the dry season, are dried at a temperature which is preferably lower than 40° C., and are then ground or pulverised. The powder obtained contains an active constituent, usable as a therapeutic, that may be extracted by the following procedure.

20 g. of dry powder of roots of *Securidaca longiperonculata* are introduced into a receptacle containing 100 g. of 90° B. ethyl alcohol. The balloon-flask in which the extraction is carried out is surmounted by a reflux condenser. The mixture is heated to a temperature of 80° C. for one hour. The solution is then cooled, filtered, precipitated by addition of twice its volume of ether; the precipitate is then left for two hours, the clear liquid floating on the surface is decanted, the precipitate is centrifuged and then desiccated in a vacuum. About 1 gram of amorphous substance is obtained, which, after crushing, becomes a yellowish powder, insoluble in ether, light hydrocarbons and chloroform. This powder is soluble in water, in alcohols and in basic solutions with which it becomes yellowish.

Instead of ethyl alcohol, it is possible to use other lower aliphatic alcohol such as, for example, methyl, propyl or isopropyl alcohol; the extraction temperature, which can vary according to the boiling temperature of the alcohol used, is generally above 50° C. and below 100° C. approximately.

The ultra-violet spectrum of the powder, in aqueous solution at a concentration of 0.025%, gives a series of absorption maxima between wave lengths of from 301 and 226 m$\mu$ and a shoulder in the absorption layer at 285 m$\mu$.

Its nuclear magnetic resonance spectrum in hexadeutero dimethylsulfoxide, at 100 megahertz and using tetramethylsilane as a reference system, produces three resonance bands at $1 \times 10^{-6}$ $3.5 \times 10^{-6}$ and at $7-8 \times 10^{-6}$.

A single spot was obtained when introduced into a mixture of chloroform and trichloroacetic acid, in the ascending unidimensional chromatography.

The acid hydrolysis of the product may be effected by heating for 2 hours, at a temperature of 105° C., a 10% aqueous solution in the presence of a double volume of 50% sulfuric acid. After recooling and extracting with ether it is noted:

(a) That the aqueous phase, after sulfuric acid neutralisation by means of calcium carbonate, strongly reduces the Fehling's solution and that, by ascending unidimensional chromatography in the mixture trichloroacetic acid and chloroform, it shows the existence of five spots;

(b) That the ether phase, treated with active carbon, filtered and left in the open air, gives, by slow evaporation of the solvent, a precipitation of small lamellar crystals having a melting point situated in the neighborhood of 250° C. These crystals give a positive Lieberman reaction.

The toxicity of the product according to the invention has been determined on mice:

orally, a $DL_{50}$ of 1.5 g./kg. by live weight has been determined by parenteral injection, a $DL_{50}$ in the order of 0.050 g./kg. by live weight has been determined.

The product according to the invention was administered intravenously to rabbits at a dose of 0.5 mg./kg. by weight. Two injections given at intervals of four days have allowed the following results to be noted:

(a) Blood corpuscle count: average augmentation of 600,000 red corpuscles, average decrease of 1,000 white corpuscles/mm.$_3$: haemoglobin augmented, corpuscular value unchanged.

(b) Blood formula (average modifications):

|  | Before injection | After 2 injections |
|---|---|---|
| Polynuclear neutrophiles | 62 | 34 |
| Polynuclear eosinophiles | 5 | 1 |
| Polynuclear basophiles | 0 | 0 |
| Large lymphocytes | 26 | 50 |
| Small lymphocytes | 6 | 14 |
| Monocytes | 1 | 1 |

(c) Electrophorus of the blood proteins: Decrease of the $\alpha^2$ in percentage) augmentation of the $\beta$ and $\gamma$, decrease of the S/G.

(d) Plasmatic proteins: increase from 61 to 71 g./litre (average figures).

The action of the product may then be summarized as follows: polyglobuly, decrease of the granulocytes (relative and absolute), breaking down of the eosinophiles, large absolute augmentation of the lymphocytes, especially the large; unchanged monocytes, protein increase with respect to the $\beta$ and $\gamma$ globulines, small modification of the $\alpha^1$, $\alpha^2$ decreased in relative value, small modification in absolute value.

It has been found according to the invention that the powder obtained by grinding the roots of *Securidaca longipedonculata* contains active constituents that may be used in therapeutics for the treatment of eczema and psoriasis and that these active constituents may be extracted from said powder by means of an extraction process, known per se, consisting in treating this powder with a lower aliphatic alcohol, at a temperature of about 80° C.

The present invention therefore relates to a treatment of skin diseases and in particular the treatment of eczema and psoriasis, characterised in that a powder of roots of *Securidaca longipedonculata* or an extract obtained by treating said powder by means of a lower aliphatic alcohol according to conventional extraction methods, is used.

In the following, "active product" will designate the extract obtained by the treatment of the powder of the roots of *Securidaca longipedonculata* by means of an aliphatic alcohol and precipitation and drying of the product contained in this extract.

The process according to the invention of treating eczema and psoriasis in human beings consists in administering the product by intravenous injections or "per os." In this latter case, the doses used are between about 6 and 400 mg. of active product per day.

The process was applied to 34 cases of skin diseases and the following results have been obtained.

out of 17 cases of psoriasis, 11 lasting cures were ascertained, 2 cures were obtained due to the simultaneous use of a specific desensitizer, 2 clear improvements and 2 failures:

out of 8 cases of eczema, 7 lasting cures were ascertained and 1 cure obtained due to the simultaneous use of a conventional specific desensitizer;

out of 2 cases of cheloids, 2 complete cures were ascertained; out of 1 case of prurigo sterophulus, 1 complete cure was likewise ascertained;

the same treatment was applied to ecezma in infants, using 5 mg. of active product per kilo of weight of the subject treated; out of 6 cases treated, 6 cures were obtained.

The active product for treatment according to the invention may be used in the form of cachets or conditioned in capsules when it is administered "per os." The active product may thus be conditioned with various additives such as, for example, lactose, magnesium stearate or kaolin in gelatine capsules of the "snap-fit" type sold commercially by Parke-Davis. As in certain cases, and more particularly when it is desired to use the powder of the root of *Securidaca longipedonculata* directly, the product may cause certain irritations of the digestive mucuous membranes, a conditioning will be used in an intestinally dissolving membrane and/or in the presence of a coating agent. For preparing syrup containing the active product, a preserving agent which will render the aqueous solution unchangeable will preferably be added to said solution.

What we claim is:

1. The process for the extraction of a substance from the roots of *Securidaca longipedonculata* which is active in the treatment of human psoriasis and eczema when administered orally, which consists of drying the roots at a temperature lower than 40° C. grinding the dried material, extracting the material with an aliphatic alcohol of 1 to 3 carbon atoms at reflux, in the proportion of five parts by weight of the alcohol per part of the ground material for about one hour, cooling, separating the soluble from the insoluble matter, by filtration, adding to the alcohol solution twice the volume of ether and separating the resulting product by centrifugation.

2. The active product from the roots of *Securidaca longipedonculata* which (1) is soluble in an aliphatic alcohol of 1 to 3 carbon atoms, at 50–100° C., (2) exhibits in aqueous solution an ultra-violet spectrum with a shoulder at 285 m$\mu$, (3) exhibits a nuclear magnetic resonance spectrum in hexadeutero dimethylsulfoxide, at 100 megahertz and using tetramethylsilane as a reference system, with three resonance bands at $1 \times 10^{-6}$, $3.5 \times 10^{-6}$ and at $7-8 \times 10^{-6}$, and which (4) on acid hydrolysis gives a material soluble in water which reduces Fehling's solution and which contains five components by ascending unidimensional chromatography in the mixture of trichloroacetic acid and chloroform and a material soluble in ether giving a positive Lieberman reaction prepared by the process of claim 1.

3. A method for the treatment of psoriasis and eczema in humans which consists of administering orally to said human subjects between 6 and 400 mg. daily of the active product from the roots of *Securidaca longipedonculata*, which (1) is soluble in an aliphatic alcohol of 1 to 3 carbon atoms, at 50–100° C., (2) exhibits in aqueous solution an ultra-violet spectrum with a shoulder at 285 m$\mu$ (3) exhibits a nuclear magnetic resonance spectrum in hexadeutero dimethylsulfoxide, at 100 megahertz and using tetramethylsilane as a reference system, with three resonance bands at $1 \times 10^{-6}$, $3.5 \times 10^{-6}$ and at $7-8 \times 10^{-6}$, and which (4) on acid hydrolysis gives a material soluble in water which reduces Fehling's solution and which contains five components by ascending unidimensional chromatography in the mixture of trichloroacetic acid and chloroform and a material soluble in ether giving a positive Lieberman reaction.

4. A process as defined in claim 3 wherein the active product is administered per os at the dose of 2 to 6 mg. per kg. per day to young children.

5. A process as defined in claim 3 wherein the active product is administered per os at the dose of 50 to 400 mg. per day to adults.

References Cited

Chem. Obst. (1), 53, 10665f (1959).
Chem. Obst. (2), 60, 8346d (1964).

STANLEY J. FREIDMAN, Primary Examiner